United States Patent Office 2,830,106
Patented Apr. 8, 1958

2,830,106

POLYMERIZATION PROCESS

George M. Good, Port Chester, N. Y., and Albert P. Paul, Plainfield, N. J., assignors to Shell Development Company, New York, N. Y., a corporation of Delaware No Drawing. Application April 9, 1956
Serial No. 576,787

6 Claims. (Cl. 260—683.15)

This invention relates to the dimerization of olefins, and more particularly of olefins having at least six carbon atoms in a chain and having a terminal double bond.

The polymerization of such olefins is known to the art. In general, polymerization is not specifically directed to the production of dimers but rather to the production of a mixture of dimers and higher polymers. The polymerization catalysts generally employed by the prior art in such polymerizations are acidic catalysts, such as Friedel-Crafts catalyst or sulfuric acid. Such catalysts are highly active in the isomerization of terminal olefins to internal olefins, i. e., such catalysts promote the shifting of the double bond from its terminal position to a position in the chain. Hence, if such catalysts are employed in the polymerization of olefins in which it is desired to produce a high proportion of dimer, e. g., by reducing the reaction time, then the recovered monomers are largely different from the alpha olefin charged and are instead internally double-bonded olefins.

It is an object of the present invention to convert alpha olefins into dimers thereof. It is a further object to provide a process for the production of olefins suitable for conversion into superior lubricating oils and into useful chemicals. It is a further object to provide a process in which alpha olefins are partly converted to dimers thereof and partly recovered in unconverted form.

In accordance with the present invention it has now been found possible to selectively dimerize alpha olefins to produce a dimer having a high content of terminal double bonds and to leave the remainder of the monomer essentially unchanged by isomerization. Briefly stated, the present invention comprises a process for converting an alpha olefin having at least six carbon atoms in a chain into dimer by contacting the olefin in liquid phase at a temperature below 100° C. with a catalyst comprising essentially activated alumina containing about 0.5 to 3% by weight HF and preferably about 1% by weight HF and recovering from the reaction product the resulting dimer having a high percentage of terminal double bonds, and unconverted monomer. For high efficiency of operation the monomer is then recycled to the process for further conversion.

Olefins suitable for conversion in accordance with the present invention are normally liquid terminal olefins having at least six carbon atoms in a chain. It is preferred to use olefins which have no alkyl side chains or which are only slightly branched, the branch groups being methyl or ethyl. The invention is particularly suitable for the conversion of terminal olefins having from six to fifteen carbon atoms in the chain, and particularly n-alkenes.

The present invention will be further illustrated by means of the following examples:

EXAMPLE I

A catalyst consisting of activated alumina containing 1% by weight HF was prepared by treating ⅛ inch pills of activated alumina (having a surface area of 186 sq. m./gm., and containing only 0.2% Si and 0.02% Na) with a calculated amount of 48% aqueous hydrogen fluoride solution. After draining and drying at 120° C., the resulting contact mass was treated by heating at 600° C., for one hour in a hydrogen stream. 50 cc. of the contact mass was placed in a tubular fixed bed reactor which was then brought to a pressure of 600 lb./sq. in. gauge with nitrogen and heated to 80° C. Liquid hexene-1 was then pumped through the reactor at a liquid hourly space velocity of 5 v./v./hr. The reaction was slightly exothermic, necessitating some external cooling of the reactor to maintain the desired reaction temperature. The liquid product was distilled and the resulting cuts were analyzed by infrared spectroscopy to determine the olefin types present and by fluorescent chromatography to determine the percentage of saturates, olefins, and aromatics in each cut. 91% by weight of the amount charged was recovered as liquid product, of which 45% boiled between 63.8 and 74.0° C., 4% by weight between 74.0 and 196° C., 21% by weight between 196° C. and 217° C. and 16% by weight was a bottoms cut boiling above 217° C. Type analyses of the $C_6$ and $C_{12}$ cuts are shown under "run No. 4" in Table I.

EXAMPLE II

A series of runs, carried out in the manner described in Example I, illustrates the effect of varying the concentration of HF on the alumina. The results of these runs are presented in Table I. In runs 1 to 3, which were carried out at 35° C., with activated alumina catalysts containing, respectively, 1%, 3% and 6% HF, the yield of $C_{12}$ product was progressively less, being zero in run No. 3. The yield of material heavier than $C_{12}$ dropped in a corresponding manner so that a catalyst of 6% HF on alumina showed only extremely low polymerization activity. The content of terminal olefin in the $C_6$ cut remained high throughout, but the content of terminal olefin in the $C_{12}$ product dropped from 70% in run 1 to 41.4% in run 2.

Comparing runs 4 through 6, which were carried out at 80° C., it is seen that the yield of $C_{12}$ product also decreased rapidly but was at a higher level than in runs 1 through 3 at 35° C. The percentage of terminal olefin in the $C_6$ cut was 80% in run 4 and very high in runs 5 and 6, but the percentage of terminal olefin in the $C_{12}$ product decreased from about 70% in run 4 to about 25% in run 6.

It is apparent that best results are obtained with a catalyst of about 1% HF on alumina at temperatures of about 35° C. and that by operating with somewhat higher HF content at somewhat higher temperatures satisfactory results may still be obtained, but the HF content should not exceed about 3% by weight based on the alumina.

Table I

| Run No | 1 | 2 | 3 | 4 | 5 | 6 |
|---|---|---|---|---|---|---|
| HF on catalyst, percent wt | 1 | 3 | 6 | 1 | 3 | 6 |
| Reaction Temp., °C | 35 | 35 | 35 | 80 | 80 | 80 |
| Product Yields, Percent w (basis feed): | | | | | | |
| $C_6$ | 58 | 70 | 73 | 45 | 62 | 69 |
| Intermediate Fraction | 2 | 3 | 2 | 4 | 3 | 2 |
| $C_{12}$ | 10 | 2 | 0 | 21 | 10 | 4 |
| $>C_{12}$ | 14 | 12 | 9 | 16 | 11 | 11 |
| $C_6$: | | | | | | |
| Olefin Types*, percent mole— | | | | | | |
| RCH=CHR (trans) | 3.8 | 4.1 | 0 | 20 | 3.5 | 1.6 |
| RCH=CH$_2$ | 96.2 | 95.9 | 100 | 80 | 96.5 | 98.0 |
| R$_2$C=CH$_2$ | 0 | 0 | 0 | 0 | 0 | 0 |
| Saturates | 0 | 0 | 0 | 0 | 0 | 0 |
| Olefins | 99+ | 100 | 100 | 100— | 100 | 100 |
| Aromatics | 1— | 0 | Traces | Traces | Traces | Traces |
| $C_{12}$: | | | | | | |
| Olefin Types*, percent mole— | | | | | | |
| RCH=CHR (trans) | 29.8 | 58.6 | | 29.6 | 53.3 | 55.1 |
| RCH=CH$_2$ | Traces | 10.3 | | Traces | Traces | 19.4 |
| R$_2$C=CH$_2$ | 70.2 | 31.1 | | 70.4 | 46.7 | 25.5 |
| Saturates | Traces | 5 | | Traces | 3 | 7 |
| Olefins | 99 | 95 | | 98 | 95 | 92 |
| Aromatics | 1 | 0 | | 2 | 2 | 1 |

*Analysis normalized, R$_2$C=CHR and Cis—RCH=CHR not determined.

EXAMPLE III

A series of runs were carried out in which hexene-1 was polymerized in the manner described in Example I but at temperatures ranging from 35° to 200° C. and with catalysts consisting, in one case, of 1% HF on activated alumina and in the other of 1% HF on activated alumina which also contained 1% by weight of platinum and some chlorine. The results of these runs are presented in Table II, in which runs 1 through 4 were made with HF-alumina catalyst and runs 5 through 8 with HF-alumina-platinum catalyst.

Table II

| Catalyst | HF/Al$_2$O$_3$ | | | | Pt/HF/Al$_2$O$_3$ | | | |
|---|---|---|---|---|---|---|---|---|
| Run No | 1 | 2 | 3 | 4 | 5 | 6 | 7 | 8 |
| Reaction Temp.,° C | 35 | 80 | 135 | 200 | 35 | 80 | 135 | 200 |
| Total Liquid Product Yield, percent wt. (basis feed) | 87 | 91 | 99 | 93 | 88 | 93 | 99 | 95 |
| Product Yields, percent wt. (basis feed): | | | | | | | | |
| $C_6$ | 58 | 45 | 57 | 47 | 63 | 59 | 58 | 33 |
| Intermediate Fraction | 2 | 4 | 5 | 8 | 3 | 4 | 13 | 15 |
| $C_{12}$ | 10 | 21 | 22 | 23 | 5 | 13 | 12 | 17 |
| $>C_{12}$ | 14 | 16 | 8 | 10 | 11 | 11 | 13 | 28 |
| $C_6$: | | | | | | | | |
| Olefin Types*, percent mole— | | | | | | | | |
| RCH=CHR (trans) | 3.8 | 20 | 79.1 | 89.1 | 8.8 | 38.0 | 76.9 | 89.2 |
| RCH=CH$_2$ | 94.2 | 80 | 20.9 | 10.9 | 91.2 | 62.0 | 23.1 | 10.8 |
| R$_2$C=CH$_2$ | 0 | 0 | 0 | 0 | 0 | 0 | 0 | 0 |
| Percent Saturates | 0 | 0 | 0 | 1 | 0 | 0 | 0 | 13 |
| Percent Olefins | 99+ | 100— | 100— | 99 | 100— | 100— | 99+ | 86 |
| Percent Aromatics | 1— | Traces | Traces | Traces | Traces | Traces | 1— | 1 |
| $C_{12}$: | | | | | | | | |
| Olefin Types*, percent mole— | | | | | | | | |
| RCH=CHR (trans) | 29.8 | 29.6 | 39.4 | 58.9 | 45.6 | 44.5 | 53.4 | 65.8 |
| RCH=CH$_2$ | Traces | Traces | Traces | Traces | Traces | Traces | Traces | Traces |
| R$_2$C=CH$_2$ | 70.2 | 70.4 | 60.6 | 41.1 | 54.4 | 55.5 | 46.6 | 34.2 |
| FIA— | | | | | | | | |
| Percent Saturates | Traces | Traces | 1 | 1 | 2 | 1 | 5 | 10 |
| Percent Olefins | 99 | 98 | 97 | 96 | 97 | 98 | 93 | 88 |
| Percent Aromatics | 1 | 2 | 2 | 3 | 1 | 1 | 2 | 2 |

*Analysis normalized; R$_2$C=CHR and cis—RCH=CHR not determined.

In these runs, although the yield of $C_{12}$ product increased with increasing temperature, the isomerization of unpolymerized monomer to the internal olefin increased rapidly as temperature went up and the percentage of terminal olefin in $C_{12}$ polymer decreased substantially. It is thus illustrated that temperatures of 135 and 200° C. are unsuitable for the purpose of the present invention.

At a given set of conditions the percentage conversion of the monomer decreases with increasing molecular weight. For example, in reactions carried out at the conditions of Example I the conversion of hexene-1 was 55%, decene-1 conversion was 25% and dodecene-1 conversion was 15%. Dimer yields are on the order of 40% of the converted monomers. Conversion can be increased when reacting the heavier monomers by increasing the contact time, e. g. up to about 30 minutes (LHSV = 2 v./v./hr.).

As has been illustrated in part in the above examples, the catalyst of the present invention comprises essentially activated alumina having a content of from about 0.5 to 3% by weight of HF, preferably about 1% HF. The higher concentrations of HF in the range stated may be used at the higher temperatures.

By defining the catalyst as "activated alumina containing hydrogen fluoride" it is not intended to imply that the HF is present on the alumina in free form. It is probable that the HF is combined in some form with alumina and small amounts of water. Catalysts suitable for the present invention are composites in which activated alumina has been treated with a sufficient amount of HF, generally in aqueous solution, that the finished material contains fluorine to the extent of about 0.5 to 3% by weight, expressed as HF, based on the alumina present. It is preferred to heat the composite resulting from treatment of activated alumina with HF to a temperature between 500° and 900° C., most preferably not above 800° C., for a time from about one-half hour to about 8 hours or more, prior to use. It is preferred to carry out such heating in the absence of air, e. g., in a stream of an inert gas such as nitrogen or hydrogen.

Instead of being impregnated with aqueous HF, the catalyst may be impregnated with an equivalent amount of aqueous NH₄F. The resulting composite must be heated at the conditions stated above to decompose the ammonium salt and produce a catalyst of "activated alumina containing hydrogen fluoride."

The catalyst employed in the process of the present invention may contain materials which are relatively inert with respect to the dimerization process. Thus, it has been shown that a small amount of platinum, though not of any advantage, interfered only slightly with the function of the catalyst at the temperatures in the range of the present process; it caused significant saturation of olefin monomer at higher temperatures.

The polymerization reaction of the present invention is carried out at temperatures in the range between 20° and 90° C. and preferably between 30° and 40° C. Pressures may range from atmospheric to any desired value but need not ordinarily exceed a pressure sufficient to maintain the product in liquid phase and to pump it through the equipment. Contact times can be in the range from 5 minutes to 30 minutes, times between 10 and 20 minutes being particularly suitable.

In a preferred operation the process is carried out by pumping the monoolefin feed liquid through a fixed catalyst bed provided with means for removing the heat of reaction. The reaction may also be carried out in a series of fixed catalyst beds connected by heat exchange means in which the heat of the reaction is removed from the flowing hydrocarbon stream. If desired, the reaction may also be carried out in a non-continuous manner in batch equipment or in a continuous manner employing fluidized or moving bed methods known to the art.

In the preferred method of continuous operation the product withdrawn from the reaction is separated into at least a monomer fraction consisting essentially of the same material as that originally charged, which is returned to the reaction zone for further conversion, and into a dimer fraction consisting of dimerized charge olefin. Depending on the use to be made of the product, the heavier polymers may be permitted to remain with the dimer or may be recovered and utilized separately.

The polymers produced in accordance with the present invention have a high content of terminal double bonds and are thus particularly suitable for conversion to a number of useful end products. For example, they can be hydrated to produce alcohols suitable as plasticizers in commercial plastics compositions, or can be converted to such alcohols by means of the "oxo" reaction and hydrogenation of the resulting carbonyl compounds. The polymers, and particularly the dimers, are also very suitable for the production of a variety of high molecular weight products of the type, known to the art, which is formed by the interpolymerization of terminal olefins with unsaturated non-hydrocarbon materials, such as certain unsaturated organic esters, unsaturated dicarboxylic acids or anhydrides and other unsaturated compounds, followed, in some cases, by hydrolysis of the resulting copolymer.

The dimers produced in accordance with the present invention are particularly suitable in use as intermediates in the production of high quality lubricating oils. For this purpose it is preferred to employ the dimers produced by conversion of terminal olefins having from 8 to 12 carbon atoms in a chain, the monomers preferably being unbranched or only slightly branched. The further conversion of such dimers to lubricating oils is carried out by use of conventional polymerization catalyst e. g., acid catalyst such as liquid sulfuric acid, or Friedel-Crafts catalysts such as boron trifluoride or aluminum chloride, either per se or in the form of their hydrocarbon complexes.

The dimers of olefins having 12 or more carbon atoms in a chain are, themselves, lubricating oils of very high viscosity index and low pour point. These materials can be hydrogenated, if desired, and compounded with other oils and/or additives such as oxidation inhibitors, detergents, and the like.

We claim as our invention:

1. A process for converting an alpha olefin having at least six carbon atoms in a chain into a dimer which comprises contacting said olefin in liquid phase at a temperature below 90° C. with a solid catalyst consisting of activated alumina containing about 0.5% to 3% by weight hydrogen fluoride, based on alumina, and recovering from the product a monomer fraction containing predominantly unconverted alpha olefin and a dimer fraction.

2. A process according to claim 1 in which said catalyst contains about 1% by weight HF on alumina and said temperature is between 30 and 40° C.

3. A process according to claim 1 in which said olefin is a normal olefin having from 6 to 12 carbon atoms per molecule.

4. A process according to claim 1 in which said catalyst is heated to a temperature between 500° and 900° C. for from one-half to eight hours prior to contact with said olefin.

5. A process for converting an alpha olefin having from 6 to 15 carbon atoms in a chain into a dimer which comprises contacting said olefin in a reaction zone in liquid phase at a temperature below 90° C. with a solid catalyst consisting of activated alumina containing about 0.5 to 3% by weight of hydrogen fluoride, separating the effluent from the reaction zone into at least a fraction consisting of monomer containing predominantly alpha olfin and a fraction consisting of dimer, recovering said fraction of dimer as product and returning said monomer fraction to said reaction zone for further conversion.

6. A process according to claim 1 in which solid inert material is associated with said catalyst.

References Cited in the file of this patent

UNITED STATES PATENTS

| | | |
|---|---|---|
| 2,068,016 | Gayer | Jan. 19, 1937 |
| 2,380,234 | Hall | July 10, 1945 |